No. 707,475. Patented Aug. 19, 1902.
J. A. WHELAN.
WEED PULLER.
(Application filed Oct. 23, 1901.)
(No Model.)

Witnesses
H. L. Amer.
John H. Byrne.

Inventor
Joseph A. Whelan.
By Victor J. Evans
Attorney

THE NORRIS PETERS CO., PHOTO-LITHO., WASHINGTON, D. C.

UNITED STATES PATENT OFFICE.

JOSEPH A. WHELAN, OF ROCK SPRINGS, WYOMING.

WEED-PULLER.

SPECIFICATION forming part of Letters Patent No. 707,475, dated August 19, 1902.

Application filed October 23, 1901. Serial No. 79,721. (No model.)

*To all whom it may concern:*

Be it known that I, JOSEPH A. WHELAN, a citizen of the United States, residing at Rock Springs, in the county of Sweetwater and State of Wyoming, have invented certain new and useful Improvements in Weed-Pullers; and I do declare the following to be a full, clear, and exact description of the invention, such as will enable others skilled in the art to which it appertains to make and use the same, reference being had to the accompanying drawings, and to the figures of reference marked thereon, which form a part of this specification.

This invention relates to weed-pullers, and has for its object an improved device of this character especially adapted for the cleaning of fields of sage-brush, which will pull the brush out of the ground by the roots and prepare or clean the field for the reception of seed for the growing of hay without any further cultivation.

The invention has further objects in view, which will appear as the nature of the same is more fully understood from the following description.

The invention consists of the novel construction, combination, and arrangement of parts hereinafter fully described and claimed, and illustrated in the accompanying drawings, in which—

Figure 1:
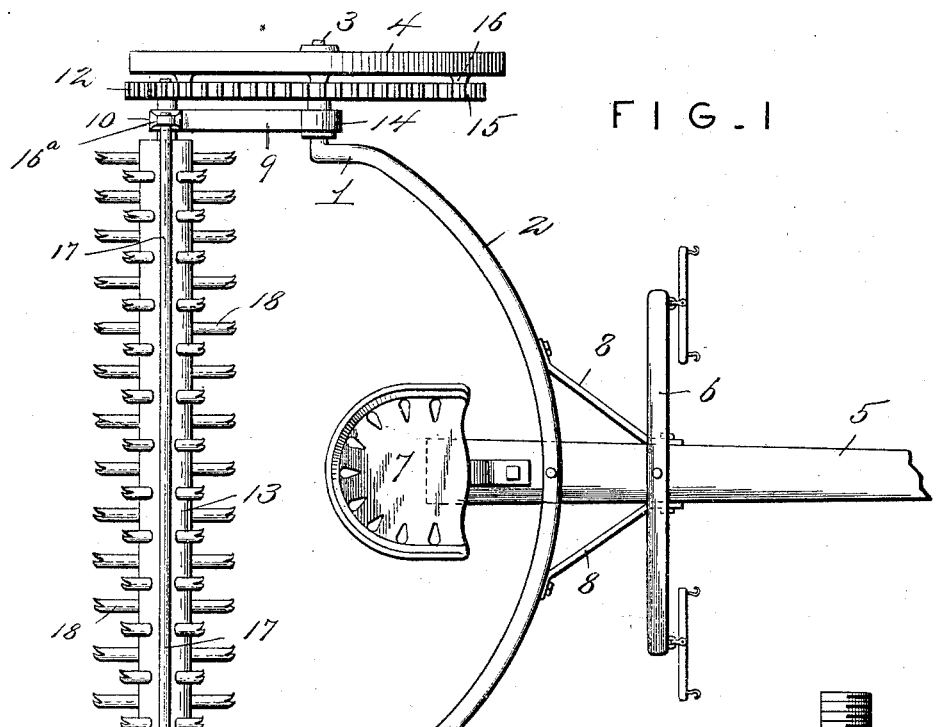
Figure 3:
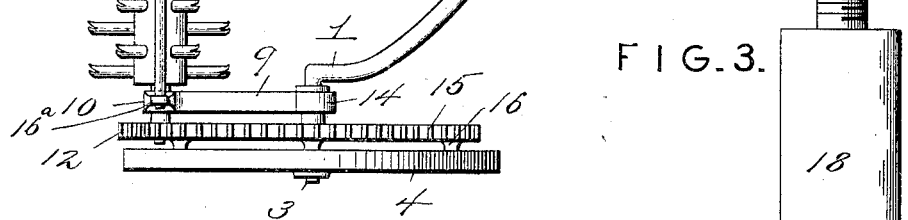
Figure 2:
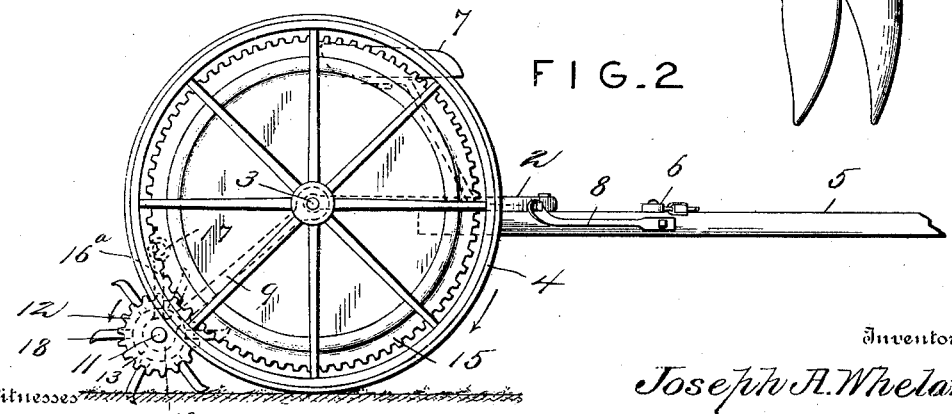

Figure 1 is a top plan view of a machine constructed in accordance with my invention. Fig. 2 is a side elevation thereof. Fig. 3 is a detail view of one of the teeth.

1 designates the frame, formed into a forwardly-curved section or part 2, adapted to rest or lie in a horizontal plane and constituting a support for the tongue and seat of the machine, as shown in the drawings. From the ends of the curved part or bail are projected the wheel-spindles 3, and mounted thereon are the wheels 4. To the front and center of the bail of the frame is fastened a tongue 5, carrying a whiffletree 6, and on an extension to the rear of the bail is fixed a seat 7. It will thus be perceived that the bail of the frame not only serves as the usual support for the wheels, but also serves as a direct support for the body of the vehicle, thus obviating the necessity of an independent supporting-frame or other usual appliances appearing generally in machines constructed for this purpose. To prevent lateral displacement of the tongue on the frame, braces 8 are provided, extending in opposite directions, having one end bolted to the tongue and the other or inner end bolted or connected to the bend of the frame.

9 designates arms, each having one of its ends provided with a bearing 10, in which is journaled a shaft 11, provided on its ends with pinions 12 and carrying a roller 13, provided on its periphery with radial teeth. The opposite ends of the arms are provided with eyes or perforations 14, through the medium of which said arms are loosely secured to the spindles 3, thereby presenting the pinions 12 to mesh with large gear-wheels 15, fixed to the wheels 4 by suitable connections, as indicated at 16. By loosely mounting the arms on the spindles 3 the roller is permitted to have a vertical movement, enabling the same to easily ride over stones or other obstacles which may be in its path, obviating any liability of the teeth carried thereon becoming broken, and also permits the teeth to penetrate the ground, the distance of said penetration being dependent upon the weight of the roller and which may be regulated to suit the conditions of different soils.

16$^a$ designates upwardly-projecting arms, one end of each being attached to the lower ends of the arms 9 and forming therewith L-shaped arms. The opposite ends of the arms 16$^a$ are perforated for the reception of the ends of a clearing-rod 17, which clears the teeth of sage-brush.

18 designates a tooth having a reduced externally-threaded portion to engage an internally-threaded socket in the roller 11 to secure said teeth therein intermediately of each other. The lower end of each tooth is forked, constituting oppositely-arranged teeth having their inner edges curved eccentrically to each other and the prongs terminating in points, the upper portion of the curves terminating in union with each other, substantially as shown in Fig. 3 of the drawings. This construction presents an engagement of the tooth with the sage-brush in such a manner that the brush is drawn into the base of the opening between the prongs of the fork and held therein with a gripping force sufficient to pull the brush from the ground.

While the teeth with triangular bifurcations operate with reasonable certainty, I have discovered that a tooth bifurcated to produce a triangular opening will not grip the brush as firmly as when provided with bifurcations having eccentrically-curved inner faces.

The advantages and mode of operation of the improvement may be explained as follows: The parts being assembled as illustrated in Figs. 1 and 2 of the drawings it is seen that the roller 13 is caused to revolve in the opposite direction to that of the wheels 4 through the medium of the large gear-wheels 15 and the pinions 12, and the teeth 18 will penetrate the ground and withdraw the sage-brush, which is cleared therefrom by the clearing-rod 17.

It is obvious from the foregoing description, taken in connection with the accompanying drawings, that the improvement provides a sage-brush puller which is cheap, durable, and efficient.

Having thus fully described my invention, what I claim as new, and desire to secure by Letters Patent, is—

1. The combination with a frame having its ends outturned to form axles, of wheels journaled thereon, gear-wheels secured to said wheels, depending arms loosely mounted on said axles between the wheels and the frame and provided with bearings at their lower ends, a shaft journaled in said bearings, a toothed roller carried by said shaft, pinions mounted on said shaft to mesh with said gear-wheels, upwardly-extending arms on the lower ends of the said depending arms and having openings in their upper ends, and a rod mounted in the openings of the said arms for clearing the roller-teeth.

2. The combination with a frame formed with axles, of wheels journaled thereon, depending arms loosely mounted on said axles and provided with bearings at their lower ends, a shaft journaled in said bearings, a toothed roller carried by said shaft, an upwardly-extending arm formed integral with the lower ends of each of the said depending arms, and having openings in their upper ends, and a rod mounted in the openings of the said arms for clearing the roller-teeth.

In testimony whereof I affix my signature in presence of two witnesses.

JOSEPH A. WHELAN.

Witnesses:
R. A. PAYNE,
T. S. TALIAFERRO, Jr.